(12) United States Patent
Mizuno et al.

(10) Patent No.: US 9,803,746 B2
(45) Date of Patent: Oct. 31, 2017

(54) VARIABLE SPEED DRIVE FOR INTERNAL COMBUSTION ENGINE

(71) Applicant: HONDA MOTOR CO., LTD., Tokyo (JP)

(72) Inventors: Kinya Mizuno, Wako (JP); Yasushi Fujimoto, Wako (JP); Hiroyuki Makita, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 358 days.

(21) Appl. No.: 14/669,645

(22) Filed: Mar. 26, 2015

(65) Prior Publication Data

US 2015/0276053 A1 Oct. 1, 2015

(30) Foreign Application Priority Data

Mar. 31, 2014 (JP) .................................. 2014-071772

(51) Int. Cl.

| F16H 61/28 | (2006.01) |
|---|---|
| F16H 61/32 | (2006.01) |
| F16H 63/18 | (2006.01) |
| F16H 3/00 | (2006.01) |
| F16H 3/089 | (2006.01) |
| F16H 3/16 | (2006.01) |

(52) U.S. Cl.
CPC ............. *F16H 61/28* (2013.01); *F16H 61/32* (2013.01); *F16H 63/18* (2013.01); *F16H 3/006* (2013.01); *F16H 3/089* (2013.01); *F16H 3/16* (2013.01); *Y10T 74/19251* (2015.01)

(58) Field of Classification Search
CPC .......... F16H 61/28; F16H 61/32; F16H 63/18; F16H 3/006; F16H 3/089; F16H 3/16
See application file for complete search history.

(56) References Cited

U.S. PATENT DOCUMENTS

| 4,601,375 A * | 7/1986 | Hayashi .............. F16D 25/0638 |
|---|---|---|
| | | 192/109 F |
| 2007/0144292 A1* | 6/2007 | Koyama ................. F16H 61/26 |
| | | 74/473.16 |
| 2010/0000363 A1* | 1/2010 | Tomoda .................. F16H 63/18 |
| | | 74/473.36 |

(Continued)

FOREIGN PATENT DOCUMENTS

JP          2011-208766 A          10/2011

*Primary Examiner* — David M Fenstermacher
(74) *Attorney, Agent, or Firm* — Birch, Stewart, Kolasch & Birch, LLP

(57) ABSTRACT

A variable speed drive wherein an impact to be transmitted to an inputting mechanism is absorbed. A shift spindle has an input side end portion to which an inputting mechanism is connected and an output side end portion supported for rotation at a transmission side supporting portion provided on a transmission case. A master arm is positioned between the input side end portion and the output side end portion in an axial direction of the shift spindle. An extension collar member is fixed integrally to the master arm. The extension collar member connects the master arm and a connection portion provided at a location of the shift spindle rather near to the input side end portion than the output side end portion. The extension collar member extends from the connection portion toward the master arm with a gap left from an outer circumferential face of the shift spindle.

13 Claims, 9 Drawing Sheets

(56) References Cited

U.S. PATENT DOCUMENTS

| | | | | |
|---|---|---|---|---|
| 2013/0255415 A1* | 10/2013 | Adachi | ................ | F16H 59/042 |
| | | | | 74/337.5 |
| 2015/0276053 A1* | 10/2015 | Mizuno | .................. | F16H 61/28 |
| | | | | 74/335 |
| 2015/0377303 A1* | 12/2015 | Adachi | ................... | F16D 13/54 |
| | | | | 192/70.27 |
| 2016/0281822 A1* | 9/2016 | Adachi | .................. | F16H 63/18 |
| 2016/0290500 A1* | 10/2016 | Ono | ....................... | F16H 61/32 |

\* cited by examiner

VARIABLE SPEED DRIVE FOR INTERNAL COMBUSTION ENGINE

CROSS-REFERENCE TO RELATED APPLICATIONS

The present application claims priority under 35 USC 119 to Japanese Patent Application No. 2014-071772 filed Mar. 31, 2014 the entire contents of which are hereby incorporated by reference.

BACKGROUND OF THE INVENTION

1. Field of the Invention

The present invention relates to a variable speed drive for driving a transmission mechanism of an internal combustion engine.

2. Description of Background Art

Conventionally, a variable speed drive for driving a transmission mechanism of an internal combustion engine includes a shift motor for rotating a shift spindle for the automatic transmission. See, for example, Japanese Patent Laid-Open No. 2011-208766.

In the structure disclosed in Japanese Patent Laid-Open No. 2011-208766 (hereinafter referred to as prior art), an inputting mechanism and shift position changing driving means, which is an operation mechanism, are disposed in such a manner that they are distributed to the left and right sides of a crankcase which serves also as a transmission case. The inputting mechanism is configured from a shift motor and a speed reduction mechanism for receiving a rotational driving power of the shift motor. Meanwhile, the operation mechanism includes a master arm which pivots integrally with rotation of the shift spindle and a stopper member for limiting the amount of the pivotal motion of the master arm by being abutted with the master arm. The shift spindle is connected to the inputting mechanism and the operation mechanism and extends leftwardly and rightwardly through the inside of the crankcase. Thus, the rotational driving power of the inputting mechanism is transmitted to the operation mechanism through the shift spindle.

In the prior art, when the shifting speed is to be raised, the master arm is pivoted at a higher pivoting speed. Thereupon, the master arm is abutted with and stopped by the stopper member. However, if the pivoting speed of the master arm is high, then the impact when the master arm is abutted with the stopper member is high, and this high impact is transmitted to the inputting mechanism through the shift spindle. In order to suppress transmission of the impact, in the prior art, the axial length of the shift spindle is made long so that the shift spindle can be twisted readily thereby to suppress transmission of the impact to the inputting mechanism. Further, as the twist angle of the shift spindle between the inputting mechanism side and the operation mechanism side increases, a greater difference appears between rotational angles of the shift spindle between the inputting mechanism side and the operation mechanism side. In order to accurately detect the angle of rotation of the axial end of the shift spindle on the operation mechanism side, a rotational angle sensor is attached to the axial end of the shift spindle on the operation mechanism side. By adopting such a configuration as just described, the prior art can achieve a shifting operation of a high accuracy at a high speed by an automatic transmission.

In addition, depending upon the layout of an internal structure of an internal combustion engine, the inputting mechanism and the operation mechanism for the shift spindle may have to be disposed on the same side on the outer side of the transmission case.

In this case, the axial length of the shift spindle becomes short and the shift spindle becomes less likely to be twisted. Therefore, if the pivoting speed of the master arm is high, then when the master arm and the stopper member are abutted with each other, the impact applied to the master arm is less likely to be absorbed sufficiently by the shift spindle. Thus, there is the possibility that the impact may be transmitted to the inputting mechanism through the shift spindle. If the impact is transmitted to the inputting mechanism, then there is the possibility that an influence may be hand on the accuracy of the inputting mechanism. In order to raise the strength of the inputting mechanism to avoid the influence, it is necessary to increase the thickness or the diameter of gears, which gives rise to a problem in upsizing and so forth of the inputting mechanism.

Further, if the rotational angle sensor is attached to the axial end of the shift spindle on the operation mechanism side, then the rotational angle sensor is disposed in the inside of the transmission case. Therefore, it may be difficult to keep the temperature of the rotational angle sensor lower than an upper temperature limit. Consequently, it is sometimes desired to attach the rotational angle sensor to the inputting mechanism side. However, where the rotational angle sensor is attached to the inputting mechanism side, if the shift spindle has a twist angle, then the accuracy of the rotational angle sensor may degrade (the value of the sensor which detects the rotational angle of the shift spindle on the inputting mechanism side may be displaced from the actual rotational angle of the shift spindle on the operation mechanism side). Thus, there is a problem that it is difficult to carry out a shifting operation at a high speed and with a high degree of accuracy.

SUMMARY AND OBJECTS OF THE INVENTION

Taking the problem described above into consideration, it is an object of an embodiment of the present invention to provide a variable speed drive for an internal combustion engine including a shift motor, where an inputting mechanism and an operation mechanism are disposed on the same side on the outer side of a transmission case, wherein a shifting operation can be carried out with a high degree of accuracy at a high speed.

According to an embodiment of the present invention, a variable speed drive for an internal combustion engine includes a transmission having a plurality of gear trains with a transmission case in which the transmission is accommodated. An operation mechanism selectively establishes a shift stage of the transmission with a shift spindle connected to the operation mechanism. An inputting mechanism is connected to the shift spindle for rotating the shift spindle. The operation mechanism includes a master arm pivoted integrally with the shift spindle and a stopper member restricting the amount of the pivotal movement of the master arm. The shift spindle has an input side end portion to which the inputting mechanism is connected and an output side end portion supported on a transmission side supporting portion provided on the transmission case. The master arm is positioned between the input side end portion and the output side end portion in an axial direction of the shift spindle. The master arm includes an extension collar member fixed integrally thereto with the extension collar member being connecting the master arm and a connection portion provided at a location of the shift spindle rather near to the input side end portion than the output side end portion. The extension collar member extends from the connection portion toward the master arm with a gap left from an outer circumferential face of the shift spindle.

According to an embodiment of the present invention, a return spring biasing the master arm in a direction to return the master arm to a position before an operation thereof is provided in the operation mechanism. The return spring has a coiled portion and two end portions extending from the coiled portion. The shift spindle is formed with a diameter smaller than the inner diameter of the coiled portion of the return spring. The shift spindle is disposed so as to extend through the coiled portion of the return spring with a spring guide collar being interposed between the shift spindle and the coiled portion of the return spring.

According to an embodiment of the present invention, a washer is interposed between the extension collar member and the transmission side supporting portion.

According to an embodiment of the present invention, spring steel is used for the shift spindle.

According to an embodiment of the present invention, a transmission includes a plurality of gear trains with a transmission case in which the transmission is accommodated. An operation mechanism selectively establishing a shift stage of the transmission with a shift spindle connected to the operation mechanism and extending outwardly from the transmission case. An inputting mechanism is connected to the shift spindle for rotating the shift spindle. A rotational angle sensor detects the angle of rotation of the shift spindle with the shift spindle being formed in a hollow cylindrical shape and having an input side end portion to which the inputting mechanism is connected and an output side end portion supported for rotation on a transmission side supporting portion of the transmission case. A sensor shaft is inserted in the inside of the shift spindle in a spaced relationship from an internal circumferential face of the shift spindle with a gap left therebetween with the sensor shaft being connected at one end portion thereof to an inner circumferential face of the output side end portion of the shift spindle. The rotational angle sensor is provided at the other end portion of the sensor shaft so as to detect the angle of rotation of the sensor shaft.

According to an embodiment of the present invention, the master arm is disposed so as to be positioned between the input side end portion and the output side end portion of the shift spindle in the axial direction of the shift spindle. Further, the master arm and the output side end portion of the shift spindle are connected to each other by the extension collar member with the gap left from the outer circumferential face of the shift spindle. Therefore, the substantial axial length between the inputting mechanism and the master arm is increased within the axial length of the shift spindle, and the twist between the inputting mechanism and the master arm can be increased. Further, an impact from the master arm is absorbed by torsional deformation of the extension collar member and the shift spindle. Thus, the impact to be transmitted to the inputting mechanism can be suppressed. Even where the inputting mechanism and the operation mechanism are disposed on the same side on the outer side of the transmission case, the impact to be transmitted to the inputting mechanism is absorbed. Thus, a shifting operation of high accuracy can be carried out at a high speed.

According to an embodiment of the present invention, since the spring guide collar is interposed between the shift spindle and the coiled portion of the return spring, the diameter of the shift spindle can be reduced without changing the size of the return spring. Further, displacement of the shift spindle in a diametrical direction can be prevented.

Further, the biasing force of the return spring can be kept fixed without the necessity to reduce the return spring in size in conformity with reduction of the diameter of the shift spindle. Further, as the diameter of the shift spindle decreases, the torsional rigidity of the shift spindle drops. Therefore, it is possible to make the shift spindle likely to be twisted. Consequently, it is possible to absorb an impact to be transmitted to the inputting mechanism. Thus, a shift operation of high accuracy can be carried out at a high speed.

According to an embodiment of the present invention, since the washer is interposed between the extension collar member and the transmission side supporting portion, abrasion or displacement in rotational movement of the extension collar member. Thus, the transmission side supporting portion can be suppressed from being caused by rubbing between them. Especially, when the shift spindle rotates, thrust force in an axial direction from the return spring acts between the rear end face of the extension collar member and the transmission side supporting portion, and also friction increases. However, since the washer is interposed at the location, the rotation of the extension collar member or the shift spindle can be smoothened. Thus, a shift operation of higher accuracy can be carried out.

According to an embodiment of the present invention, spring steel is used for the shift spindle to increase the amount of twist of the shift spindle. Therefore, an impact to be transmitted to the inputting mechanism is absorbed. Thus, a shift operation of high accuracy can be carried out at a high speed.

According to an embodiment of the present invention, since the shift spindle is formed in a hollow cylindrical shape, the torsional rigidity of the shift spindle can be reduced. Further, the sensor shaft is inserted in the inside of the shift spindle in a spaced relationship from the inner circumferential face of the shift spindle with a gap left therebetween. Further, the one end portion of the sensor shaft is connected to the inner circumferential face of the output side end portion of the shift spindle. Furthermore, the rotational angle sensor is provided at the other end portion of the sensor shaft so as to detect the angle of rotation of the sensor shaft. Therefore, the angle of rotation of the end portion of the sensor shaft which rotates integrally with the output side end portion of the shift spindle and has the same angle of rotation as that of the output side end portion of the shift spindle can be detected by the rotational angle sensor. Thus, the impact from the master arm to be transmitted to the inputting mechanism can be suppressed, and the detection accuracy of the rotational angle sensor can be made precise. Thus, even in a case in which the inputting mechanism and the operation mechanism are disposed on the same side on the outer side of the transmission case, a shift operation of high accuracy can be carried out at a high speed.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

In the following, an embodiment of the present invention is described with reference to FIGS. 1 to 8.

An internal combustion engine 1, including a variable speed drive 20 according to the present embodiment, is a horizontally opposed six-cylinder water-cooled four-stroke internal combustion engine in which a crankshaft 24 extends in a forward and rearward direction of the vehicle, namely, is placed longitudinally on the vehicle, on a motorcycle 2.

The directions forward, rearward, leftward and rightward are defined with reference to the usual standards wherein the straightforwardly advancing direction of the vehicle is the forward direction.

Figure 1:
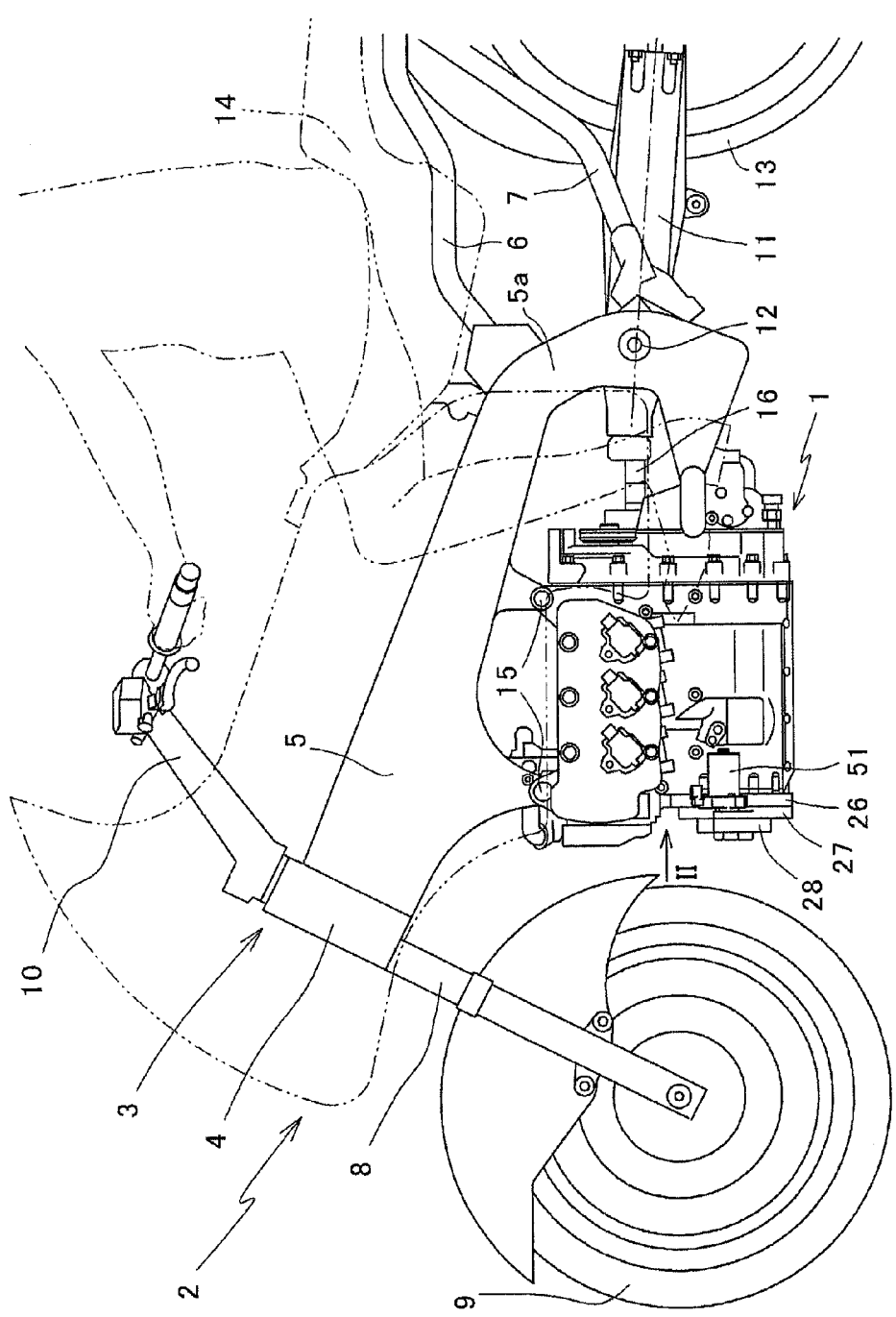
FIG. 1 is a left side elevational view, partly omitted, of a motorcycle in which a variable speed drive for an internal combustion engine according to the present invention is incorporated.

FIG. 1 is a left side elevational view of the motorcycle 2 in which the variable speed drive 20 of the internal combustion engine 1 according to the present invention is incorporated. Referring to FIG. 1, intake and exhaust systems, a fuel system and so forth are not depicted.

As depicted in FIG. 1, a vehicle body frame 3 of the motorcycle 2 includes a pair of left and right main frames 5, seat rails 6, and back stays 7. The main frames 5 extend rearwardly rather obliquely downwardly from a head pipe 4 at a front portion of the vehicle body and then extend, at the end portions thereof, downwardly via curved portions 5a. The seat rails 6 extend rearwardly rather obliquely upwardly from the curved portions 5a of the main frames 5. The back stays 7 connect a rear portion of the seat rails 6 and a lower portion of the curved portions 5a of the main frames 5.

A front fork 8 is supported for leftward and rightward rocking motion on the head pipe 4 and extends downwardly from the head pipe 4. A front wheel 9 is supported for rotation at a lower end of the front fork 8, and a steering handlebar 10 is coupled integrally to an upper end of the front fork 8.

A swing arm 11 is supported at a front end portion thereof for upward and downward rocking motion by a pivot shaft 12 at a lower portion of the curved portions 5a of the main frames 5 and extends rearwardly. A rear wheel 13 is supported for rotation at a rear end portion of the swing arm 11.

A shock absorber not depicted is connected between the curved portions 5a of the main frames 5 and the swing arm 11, and a riding seat 14 is attached to an upper portion of the seat rail 6.

The internal combustion engine 1 for driving the rear wheel 13 is disposed below the main frames 5. The internal combustion engine 1 is mounted on the motorcycle 2 by being suspended on a plurality of attachment brackets 15.

Figure 2:
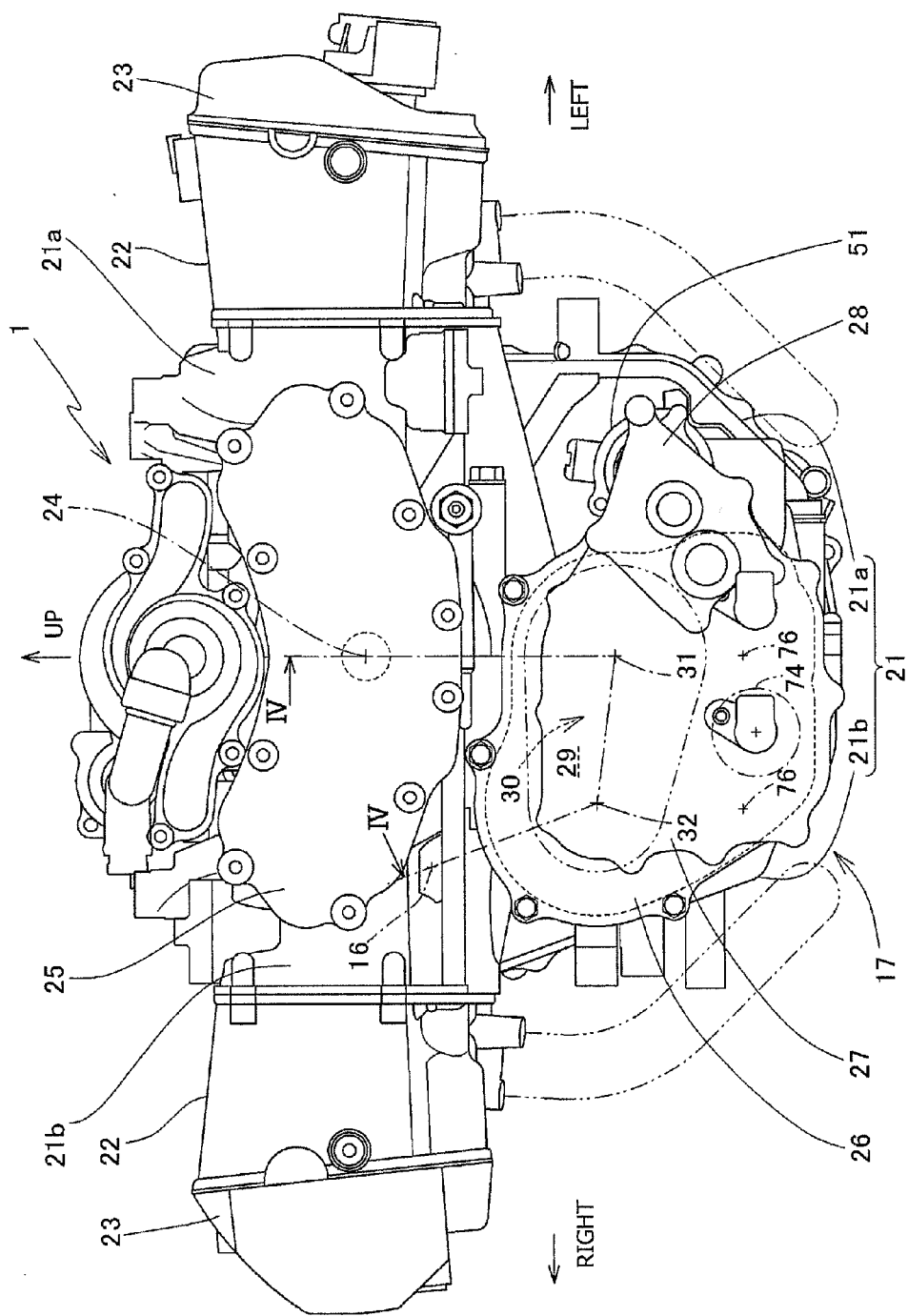
FIG. 2 is a front elevational view of the internal combustion engine as viewed in a direction indicated by an arrow mark II of FIG. 1.
Figure 3:
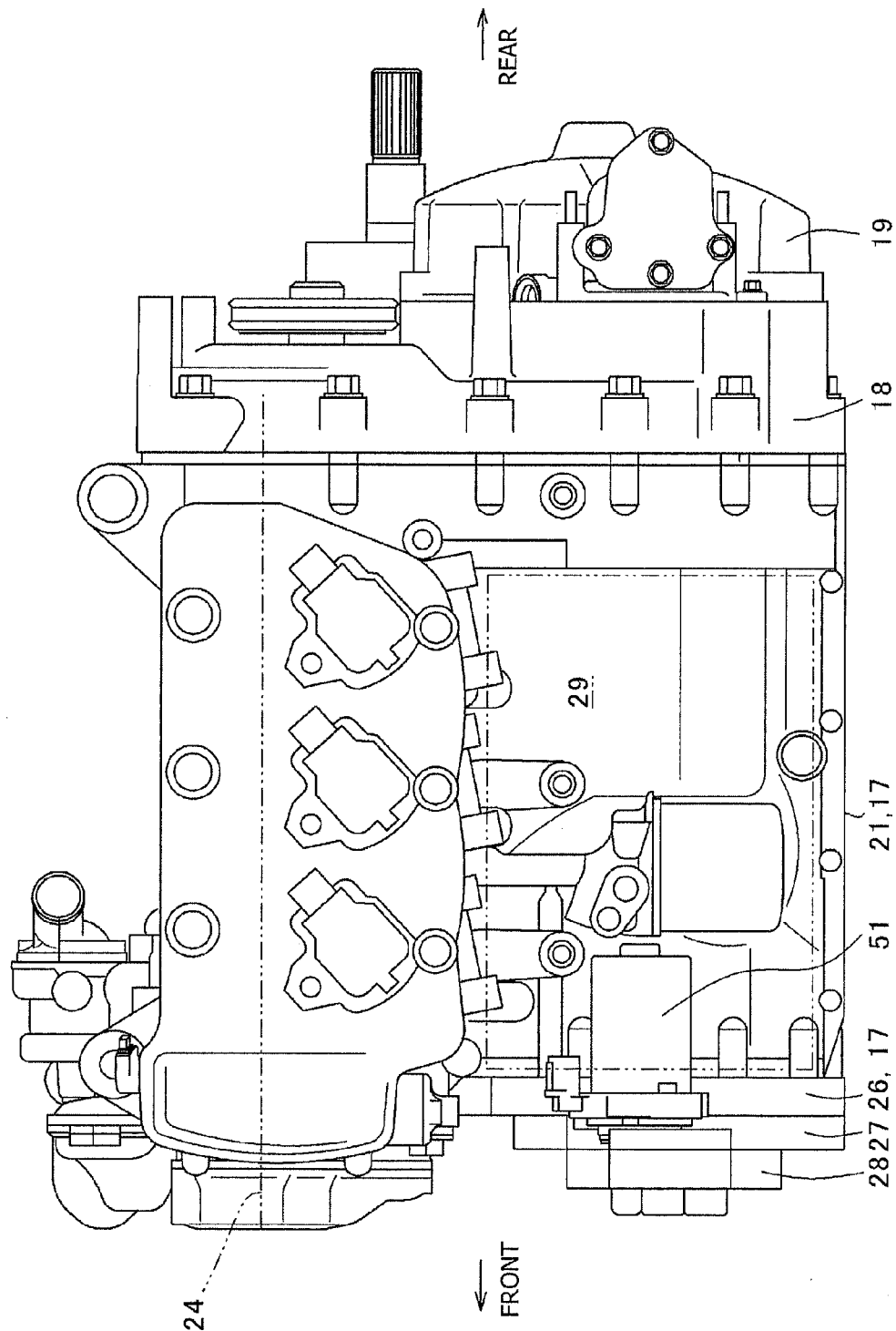
FIG. 3 is a left side elevational view of the internal combustion engine of FIG. 1.

FIG. 2 is a front elevational view of the internal combustion engine 1 as viewed in the direction indicated by an arrow mark II in FIG. 1, and FIG. 3 is a left side elevational view of the internal combustion engine of FIG. 1.

As depicted in FIG. 2, the internal combustion engine 1 includes a crankcase 21, cylinder heads 22, and cylinder head covers 23. The crankcase 21 is configured from a left crankcase 21a and a right crankcase 21b. The cylinder heads 22 are coupled to the left and right ends of the crankcase 21. The cylinder head covers 23 are placed on the respective cylinder heads 22.

The crankshaft 24 is supported for rotation between the left crankcase 21a and the right crankcase 21b and positioned at an upper portion of the crankcase 21 such that an axial line thereof is directed in the forward and rearward direction of the motorcycle 2.

Each of pistons (not depicted) in the crankcases 21a and 21b is connected to the crankshaft 24 through a connecting rod (not depicted). Thus, the crankshaft 24 is driven to rotate in an interlocking relationship with sliding movement of the pistons by combustion in combustion chambers (not depicted).

A front cover 25 is attached to a front face of an upper portion of the crankcase 21 such that it is centered at the crankshaft 24 and covers an upper portion of a front face of the crankcase 21. Further, a space at a lower portion of the crankcase 21 defined by the left crankcase 21a and the right crankcase 21b serves as a transmission chamber 29 in which a transmission 30 hereinafter described is accommodated.

As depicted in FIGS. 2 and 3, a rear cover 18 is attached behind the crankcase 21, and a clutch cover 19 is attached behind the center of a lower portion of the rear cover 18. A mission holder 26 is attached in front of a lower portion of the crankcase 21 such that it covers the front of the transmission chamber 29. Further, a change system holder 27 for holding an operation mechanism 70 for operating the shift stage of the transmission 30 is attached to the front face of the mission holder 26. The change system holder 27 extends from the center to a lower portion of the mission holder 26. Furthermore, a reduction gear holder 28 for holding an inputting mechanism 50 for supplying power to the operation mechanism 70 is attached to a left end portion of the front face of the change system holder 27. A shift motor 51 serving as a power source for the inputting mechanism 50 is provided at a left end portion of the rear face of the change system holder 27.

A gear transmission mechanism 40, a main shaft 31, a countershaft 32, a shift fork shaft 76 and a shift drum 74 are sub-assembled to a rear face of the mission holder 26 such that they are configured integrally as a cassette unit. If the cassette unit is inserted into the transmission chamber 29 configured from the left crankcase 21a and the right crankcase 21b and the mission holder 26 is attached to the front face of a lower portion of the crankcase 21 in such a manner so as to close up the front of the transmission chamber 29, then the crankcase 21 and the mission holder 26 play a role as a transmission case 17. It is to be noted that the cassette unit may be attached to the crankcase 21 in a state in which it is unitized (sub-assembled) together with the reduction gear holder 28 and the shift motor 51.

Figure 4:
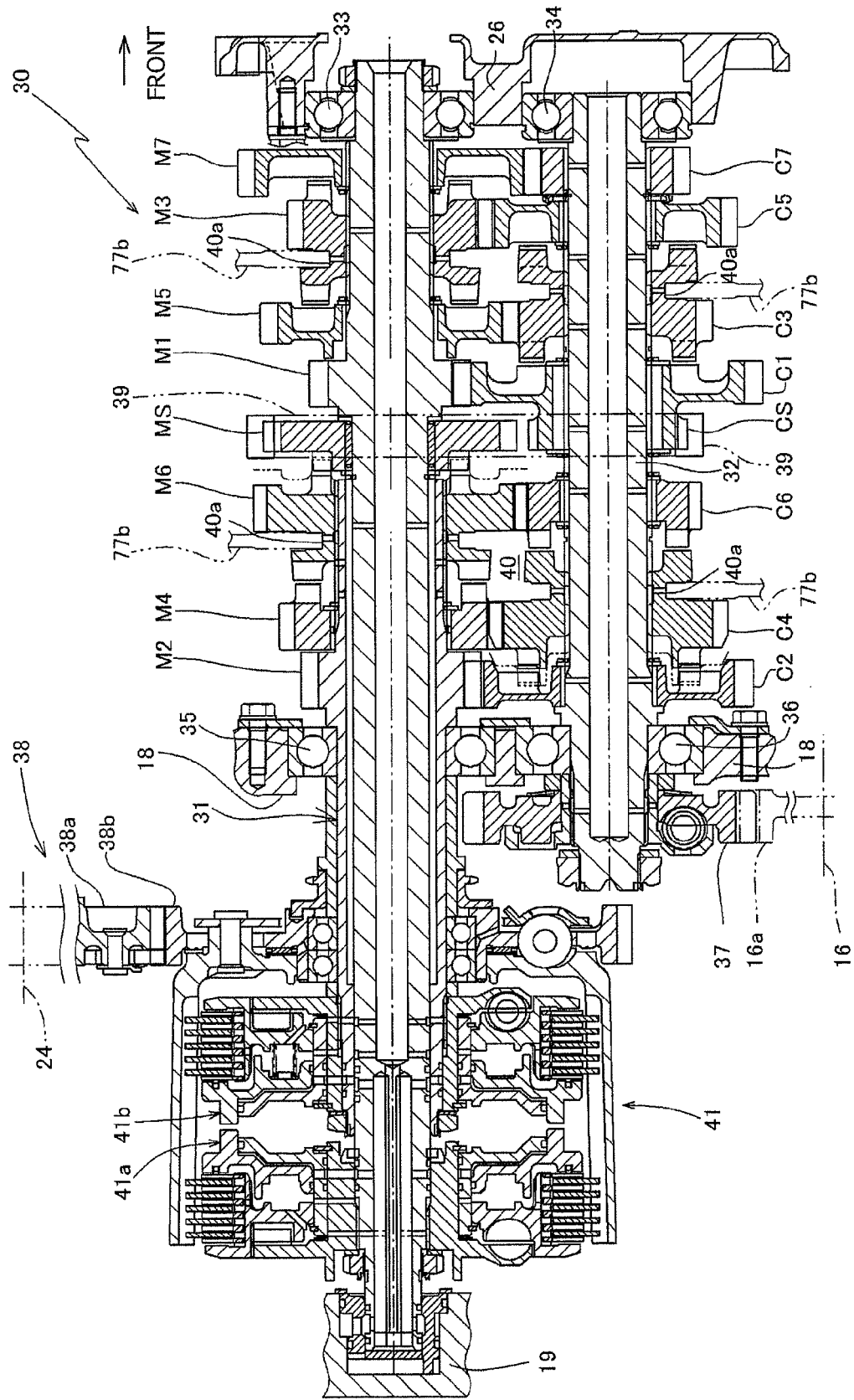
FIG. 4 is a front elevational view depicting a mission holder and a change system holder of the internal combustion engine with a reduction gear holder removed.
Figure 6:
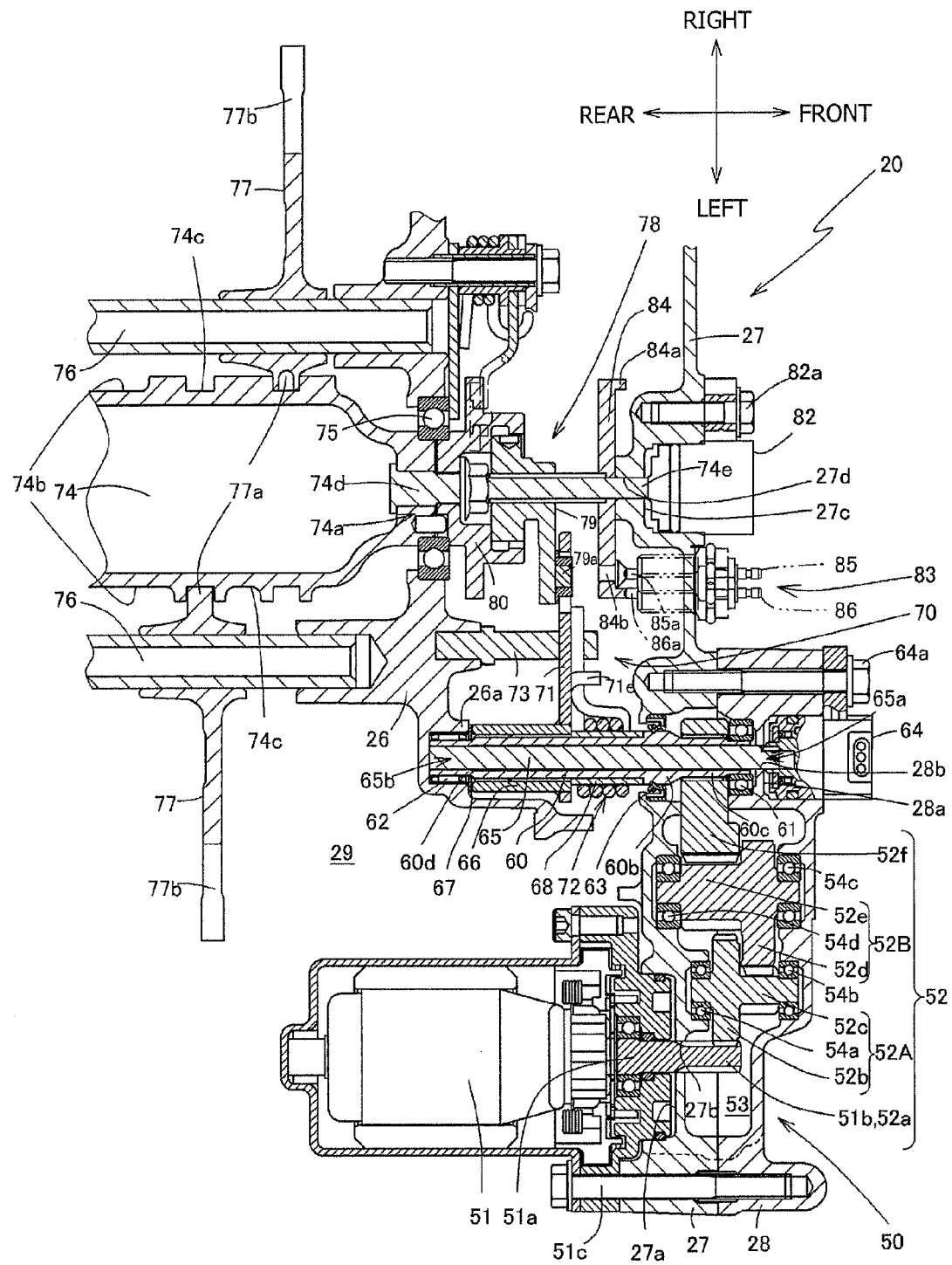
FIG. 6 is a sectional view of the variable speed drive of the internal combustion engine taken along line VI-VI of FIG. 3.

As depicted in FIGS. 3, 4 and 6, the main shaft 31, countershaft 32, shift fork shaft 76 and shift drum 74 inserted in the transmission chamber 29 are disposed so as to extend in parallel to the crankshaft 24. As depicted in FIG. 2, the main shaft 31 is disposed below the crankshaft 24, and the countershaft 32 is disposed on the right side of the main shaft 31. The shift drum 74 is disposed centrally at a lower portion of the transmission chamber 29, and two shift fork shafts 76 are disposed below the main shaft 31 and the countershaft 32 on the left and right sides of the shift drum 74.

FIG. 4 is a sectional view of the transmission 30 taken along line IV-IV of FIG. 2.

As depicted in FIG. 4, the transmission 30 includes the main shaft 31, countershaft 32 and gear transmission mechanism 40 described above, and a clutch mechanism 41. The clutch mechanism 41 is configured as a dual clutch (twin clutch) which has a first hydraulic clutch 41a and a second hydraulic clutch 41b of the hydraulic type.

The main shaft 31 is supported at one end portion thereof for rotation on the mission holder 26 through a ball bearing 33 and has the other end portion disposed so as to extend through a ball bearing 35 attached to the rear cover 18. The main shaft 31 is supported at a central portion thereof for rotation on the rear cover 18 through the ball bearing 35.

The countershaft 32 is supported at one end portion thereof for rotation on the mission holder 26 through a ball bearing 34 and has the other end portion disposed so as to extend through a ball bearing 36 attached to the rear cover 18. The countershaft 32 is supported at the other end portion thereof for rotation on the rear cover 18 through the ball bearing 36.

Seven driving transmission gears M from M1 to M7 are provided on the main shaft 31 in a range from one end portion to a central portion of the main shaft 31, and corresponding to the driving transmission gears M, driven transmission gears C from C1 to C7 are provided on the countershaft 32 such that they normally mesh with the driving transmission gears M. Further, reverse sprocket wheels MS and CS are provided at positions of the main shaft 31 and the countershaft 32 at which they mesh with each other, and a chain 39 is provided between the reverse sprocket wheels MS and CS. The gear transmission mechanism 40 is configured from the driving transmission gears M, driven transmission gears C and reverse sprocket wheels S.

The third-speed driving transmission gear M3 is a shifter gear that can slidably move on the main shaft 31 and is selectively placed into engagement with or disengagement from the fifth-speed driving transmission gear M5 or the seventh-speed driving transmission gear M7 disposed adjacent the third-speed driving transmission gear M3. The sixth-speed driving transmission gear M6 is a shifter gear which can slidably move on the main shaft 31 and is selectively placed into engagement with or disengagement from the fourth-speed driving transmission gear M4 or the reverse sprocket wheel MS disposed adjacent the sixth-speed driving transmission gear M6.

Meanwhile, the fourth-speed driven transmission gear C4 is a shifter gear which can slidably move on the countershaft 32 and is selectively placed into engagement with or disengagement from the second-speed driven transmission gear C2 or the sixth-speed driven transmission gear C6 disposed adjacent the fourth-speed driven transmission gear C4. The third-speed driven transmission gear C3 is a shifter gear that can slidably move on the countershaft 32 and is selectively placed into engagement with or disengagement from the first-speed driven transmission gear C1 or the fifth-speed driven transmission gear C5 disposed adjacent the third-speed driven transmission gear C3.

Each of the shifter gears described above has a fork engaging groove 40a provided thereon and can be slidably moved in an axial direction thereof by a shift fork 77 which engages with the fork engaging groove 40a.

It is to be noted that, for the present gear transmission mechanism 40, a neutral position at which all gear trains are invalid and no power is transmitted and a reverse position provided by the reverse sprocket wheels S are provided.

The clutch mechanism 41 is spline-fitted with the main shaft 31 extending through the rear cover 18. The clutch mechanism 41 is configured from the first hydraulic clutch 41a and the second hydraulic clutch 41b. The other end portion of the main shaft 31 is supported for rotation on the clutch cover 19.

Power of the crankshaft 24 is transmitted to the clutch mechanism 41 configured from the first hydraulic clutch 41a and the second hydraulic clutch 41b through a primary driving gear 38a and a primary driven gear 38b which form a speed reduction mechanism 38. The first hydraulic clutch 41a or the second hydraulic clutch 41b is selectively connected by a hydraulic circuit so that the power is transmitted from the crankshaft 24 to the main shaft 31.

A secondary driving gear 37 is spline-fitted with the other end portion of the countershaft 32 extending through the rear cover 18. Power transmitted from the crankshaft 24 to the main shaft 31 is transmitted to the secondary driving gear 37 through a shift stage selectively established by the gear transmission mechanism 40 and further transmitted to the rear wheel 13 (refer to FIG. 1) through a secondary driven gear 16a and a drive shaft 16.

Figure 5:
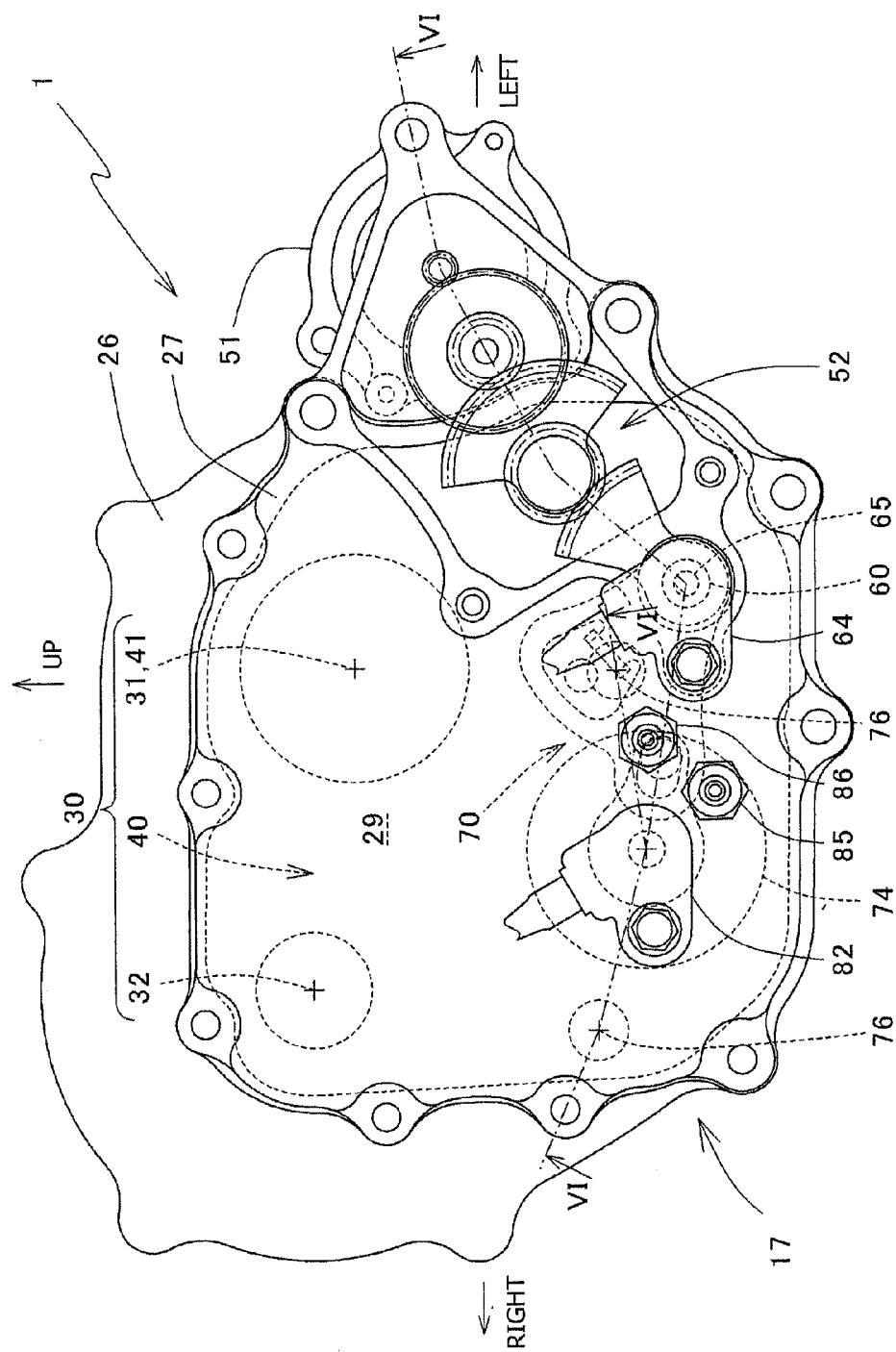
FIG. 5 is a sectional view of the transmission taken along line V-V of FIG. 2.

FIG. 5 is a front elevational view depicting the mission holder 26 and the change system holder 27 of the internal combustion engine 1 with the reduction gear holder 28 removed. FIG. 6 is a sectional view of the variable speed drive of the internal combustion engine 1 taken along line VI-VI of FIG. 5.

The variable speed drive 20 that carries out shifting by moving the shifter gears of the transmission 30 is described below with reference to FIGS. 5 and 6.

The variable speed drive 20 includes the inputting mechanism 50 disposed on the outer side of the transmission case 17, a shift spindle 60, and the operation mechanism 70. Power necessary for shifting is inputted from the shift motor 51 of the inputting mechanism 50 to the shift spindle 60, and in an interlocking relationship with rotation of the shift spindle 60, the master arm 71 of the operation mechanism 70 operates to rotate the shift drum 74 intermittently. Consequently, the shift fork 77 moves the shifter gears of the transmission 30 to carry out changeover of the shift stage.

The inputting mechanism 50 is configured from the shift motor 51 and a speed reduction gear mechanism 52 connected to the shift motor 51.

As depicted in FIGS. 3 and 6, the shift motor 51 is disposed on a rear face of a left end portion of the change system holder 27 as viewed from the front of the vehicle such that an axis of rotation thereof is directed in the forward and rearward direction so as to extend in parallel to the crankshaft 24.

As depicted in FIG. 6, a motor shaft 51a is provided on the shift motor 51 such that it projects forwardly from the shift motor 51. The motor shaft 51*a* is fitted in an opening 27*b* formed on a rear face of a left end portion of the change system holder 27 and is fixed to the change system holder 27 from the rear by a bolt 51*c*.

An end portion 51*b* of the motor shaft 51*a* projects from the rear to the inside of a reduction gear chamber 53 that is formed between the change system holder 27 and the reduction gear holder 28 and in which the speed reduction gear mechanism 52 hereinafter described is accommodated. A driving gear 52*a* for transmitting rotational power of the shift motor 51 to the speed reduction gear mechanism 52 is integrally provided on the end portion 51*b* of the motor shaft 51*a*.

As depicted in FIGS. 5 and 6, the reduction gear chamber 53 in which the speed reduction gear mechanism 52 is accommodated is disposed at a position on the right side in front of the shift motor 51. The speed reduction gear mechanism 52 accommodated in the reduction gear chamber 53 is configured from the driving gear 52*a* formed integrally on the motor shaft 51*a* of the shift motor 51, a first gear 52A, a second gear 52B, and a driven gear 52*f* in the form of a sector gear. The speed reduction gear mechanism 52 is disposed such that an axis of rotation thereof is directed in parallel to the axis of rotation of the shift motor 51.

The first gear 52A and the second gear 52B are supported for rotation on the change system holder 27 and the reduction gear holder 28, which configure the reduction gear chamber 53, through ball bearings 54*a*, 54*b*, 54*c* and 54*d*. The driven gear 52*f* is fitted against relative rotation on the shift spindle 60 hereinafter described and is supported such that the centers of rotation of the driven gear 52*f* and the shift spindle 60 coincide with each other. The first gear 52A is configured from a first idle gear 52*b* of a large diameter and a second idle gear 52*c* of a small diameter. The second gear 52B is configured from a third idle gear 52*d* of a large diameter in the form of a sector gear and a fourth idle gear 52*e* of a small diameter. The driving gear 52*a* and the first idle gear 52*b*, the second idle gear 52*c* and the third idle gear 52*d*, and the fourth idle gear 54*e* and the driven gear 52*f* normally mesh with each other. Consequently, rotational driving force of the shift motor 51 is transmitted at a reduced speed from the driving gear 52*a* to the driven gear 52*f*.

In this manner, the speed reduction gear mechanism 52 is disposed entirely in the reduction gear chamber 53 formed between the change system holder 27 and the reduction gear holder 28. Thus, only if the reduction gear holder 28 is removed as depicted in FIG. 5, the speed reduction gear mechanism 52 is exposed. Consequently, maintenance of the speed reduction gear mechanism 52 can be readily carried out.

The shift spindle 60 is made of spring steel and is disposed at an obliquely right lower position of the speed reduction gear mechanism 52 as viewed in front elevation of the vehicle such that the axial direction thereof is directed in the forward and rearward direction so as to extend in parallel to the axis of rotation of the shift motor 51.

Figure 7:
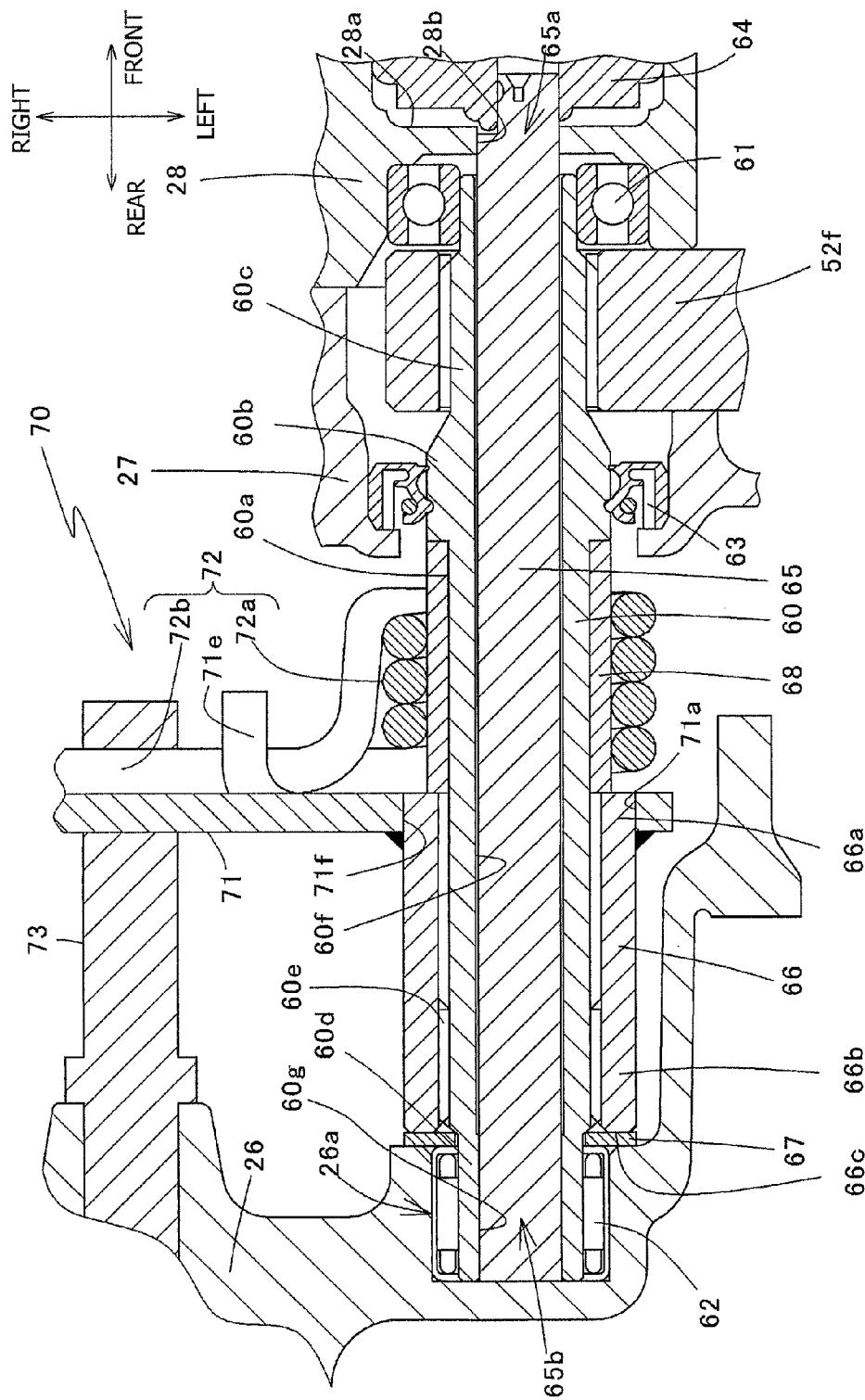
FIG. 7 is a partial enlarged view in which a shift spindle and an operation mechanism are partly enlarged.

FIG. 7 is a partial enlarged view in which elements of the variable speed drive 20 of FIG. 6 around the shift spindle 60 are partly enlarged.

As depicted in FIGS. 6 and 7, the shift spindle 60 is formed in the form of a hollow cylinder, and an outer circumferential face 60*a* of the shift spindle 60 is swollen outwardly to form an increased diameter portion 60*b* formed integrally at a location of the shift spindle 60 rather forwardly from the center in the axial direction.

As depicted in FIG. 7, from between the opposite end portions of the shift spindle 60, an input side end portion 60*c* which is one end portion of the shift spindle 60 on which the driven gear 52*f* of the speed reduction gear mechanism 52 is fitted is supported for rotation on the reduction gear holder 28 through a ball bearing 61. From between the opposite end portions of the shift spindle 60, an output side end portion 60*d* which is the other end portion of the shift spindle 60 connected to the operation mechanism 70 hereinafter described is supported for rotation at a transmission side supporting portion 26*a* formed on the front face of the mission holder 26, that configures the transmission case 17, through a needle bearing 62. Further, the increased diameter portion 60*b* of the shift spindle 60 is fitted in an oil seal 63 provided on the change system holder 27 such that it is supported for rotation on the change system holder 27 through the oil seal 63.

In the inside of the shift spindle 60, a sensor shaft 65 separate from the shift spindle 60 is disposed such that it is directed in the forward and rearward direction so as to serve as a center shaft of rotation the same as that of the shift spindle 60. An inner circumferential face of the output side end portion 60*d* from within the inner circumferential face 60*f* of the inside of the shift spindle 60 is a small diameter portion 60*g* formed with a reduced diameter.

The sensor shaft 65 is formed in a cylindrical shape a little longer than the shift spindle 60 and is inserted in the inside of the shift spindle 60 such that it is spaced from the inner circumferential face 60*f* of the shift spindle 60 with a gap left therebetween. A rear end portion 65*b*, that is one end portion of the sensor shaft 65, is force fitted against relative rotation on the small diameter portion 60*g* formed on the inner circumferential face of the output side end portion 60*d* of the shift spindle 60. The center axes of rotation of the sensor shaft 65 and the shift spindle 60 coincide with each other.

An outer circumferential face 65*c* of the sensor shaft 65 contacts only with the small diameter portion 60*g* from within the inner circumferential face 60*f* of the shift spindle 60 while it is spaced from the inner circumferential face 60*f* at a central portion and the input side end portion 60*c* with a gap left therebetween. The angle of rotation of a front end portion 65*a* which is the other end portion of the sensor shaft 65 and the angle of rotation of the output side end portion 60*d* of the shift spindle 60 coincide with each other without being influenced by a twist of the shift spindle 60.

The front end portion 65*a* of the sensor shaft 65 projects outwardly from the input side end portion 60*c* of the shift spindle 60, and extends through an opening 28*b* formed in the reduction gear holder 28, on which the input side end portion 60*c* of the shift spindle 60 is supported. Further, the front end portion 65*a* of the sensor shaft 65 connects to a rotational angle sensor 64 for detecting the angle of rotation of the shift spindle 60.

As depicted in FIGS. 5 to 7, the rotational angle sensor 64 is disposed on a front face of the reduction gear holder 28 and is positioned in front of the shift spindle 60.

As depicted in FIGS. 6 and 7, the rotational angle sensor 64 is fitted in a sensor attachment recessed portion 28*a* formed around the opening 28*b* of the reduction gear holder 28 and is fixed to the front face of the reduction gear holder 28 by a sensor attachment bolt 64*a*. The rotational angle sensor 64 detects an angle of rotation of the front end portion 65*a* of the sensor shaft 65 to detect the angle of rotation of the output side end portion 60*d* of the shift spindle 60. In the present embodiment, a potentiometer of the contact type is used for the rotational angle sensor 64. However, it is also possible to use a potentiometer of the non-contact type.

In the present embodiment, the rotational angle sensor 64 is attached to the front face of the reduction gear holder 28, which is an outer side of the transmission case 17, in front of the input side end portion 60c of the shift spindle 60. Therefore, the rotational angle sensor 64 is not influenced by heat from the combustion chambers or the transmission chamber 29 which is generated when the rotational angle sensor 64 is attached in the inside of the transmission chamber 29 located behind the output side end portion 60d of the shift spindle 60. Consequently, it is possible to keep the detection accuracy of the rotational angle sensor 64 high, and a shift operation of high accuracy can be carried out. Further, since the rotational angle sensor 64 is attached to the front face of the reduction gear holder 28, wiring of the sensor harness and exchange of the rotational angle sensor 64 can be facilitated.

As depicted in FIGS. 6 and 7, an extension collar member 66 is fitted around a portion of the shift spindle 60 rather near to the output side end portion 60d with a gap left from the outer circumferential face 60a of the shift spindle 60 such that it is directed in the forward and rearward direction and has a center axis of rotation the same as that of the shift spindle 60. The extension collar member 66 is provided to transmit rotation of the shift spindle 60 to the master arm 71 of the operation mechanism 70.

The extension collar member 66 is formed in a cylindrical shape and has a length same as that of the shift spindle 60 from a connection portion 60e to a portion in the proximity of a central portion in the axial direction. The extension collar member 66 is serration-fitted at a rear end portion 66b thereof against relative rotation with the connection portion 60e provided at a location of the shift spindle 60 rather near to the input side end portion 60c than the output side end portion 60d. Further, the extension collar member 66 is connected at a front end portion 66a thereof to the master arm 71. In other words, the extension collar member 66 extends from the connection portion 60e of the shift spindle 60 toward the master arm 71 hereinafter described with a gap left from the outer circumferential face 60a of the shift spindle 60.

A washer 67 is interposed between the extension collar member 66 and the transmission side supporting portion 26a of the mission holder 26.

The output side end portion 60d of the shift spindle 60 is fitted in the washer 67 and prevents abrasion of a rear end face 66c of the extension collar member 66 and the transmission side supporting portion 26a through rubbing therebetween upon rotation of the shift spindle 60. Further, the washer 67 decreases the frictional resistance of the shift spindle 60 upon rotation thereby to stabilize rotation of the shift spindle 60. Meanwhile, when the master arm 71 pivots, a thrust force in an axial direction from a return spring 72 acts between the rear end face 66c, which is an input side end portion of the extension collar member 66, and the transmission side supporting portion 26a. Therefore, there is a tendency that the friction between them increases. However, since the washer 67 is provided at the location, rotation of the extension collar member 66 and the shift spindle 60 is smoothened, and a shift operation of high accuracy can be achieved.

Now, the operation mechanism 70 which interlocks with rotation of the shift spindle 60 to intermittently rotate the shift drum 74 is described.

As depicted in FIG. 6, the operation mechanism 70 includes the master arm 71, the return spring 72, a stopper member 73, and a pawl ratchet mechanism 78. The master arm 71 is pivoted integrally with rotation of the shift spindle 60 through the extension collar member 66. The return spring 72 biases the master arm 71 so as to return to its position before operation of the master arm 71. The stopper member 73 restricts the amount of pivotal motion of the master arm 71. The pawl ratchet mechanism 78 interlocks with pivotal motion of the master arm 71 to rotate the shift drum 74 intermittently. The operation mechanism 70 is disposed in front of the mission holder 26 which configures the transmission case 17 together with the shift spindle 60 and the inputting mechanism 50, namely, on the outer side of the transmission case 17.

Figure 8:
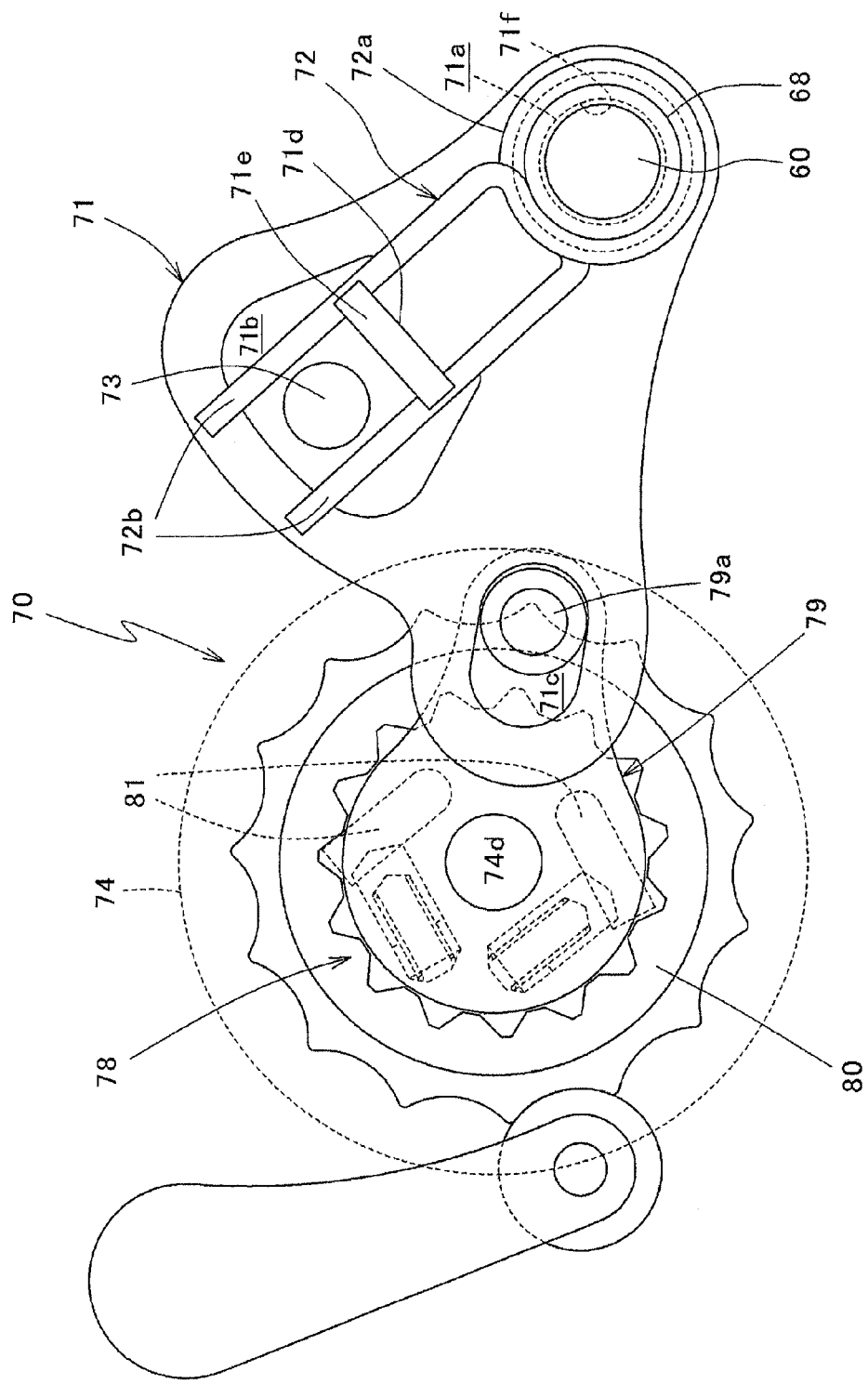
FIG. 8 is a partial enlarged view depicting the operation mechanism and the shift spindle in a partially simplified form.

FIG. 8 is a partial enlarged view depicting the operation mechanism 70 and the shift spindle 60 in a partially simplified form.

As depicted in FIGS. 6 to 8, the master arm 71 is positioned at the center between the output side end portion 60d and the input side end portion 60c of the shift spindle 60 in the axial direction of the shift spindle 60. The master arm 71 is disposed so as to connect the shift spindle 60 and the pawl ratchet mechanism 78 disposed on the right side of the shift spindle 60 to each other.

As depicted in FIG. 8, the master arm 71 is formed as a plate of a substantially triangular shape and has a round hole 71a formed at one corner portion thereof. The master arm 71 further has a restriction hole 71b of a substantially trapezoidal shape at another corner portion thereof and has a driving hole 71c of a rounded rectangular shape provided at the remaining corner portion thereof.

From among end portions of the restriction hole 71b, an end portion 71d on the round hole 71a side is bent to the front face side of the master arm 71 to form a locking portion 71e.

As depicted in FIG. 7, the round hole 71a of the master arm 71 is formed with a diameter equal to the outer diameter of the extension collar member 66. The shift spindle 60 and the front end portion 66a of the extension collar member 66 are fitted in the round hole 71a of the master arm 71. The extension collar member 66 is welded at the front end portion 66a thereof integrally to an inner circumferential face 71f of the round hole 71a of the master arm 71 such that the master arm 71 is pivoted integrally in an interlocking relationship with rotation of the shift spindle 60 around the center axis of rotation of the shift spindle 60.

As depicted in FIG. 8, the stopper pin 73 serving as a stopper member is fitted in the restriction hole 71b of the master arm 71 such that it is directed in the forward and rearward direction so as to extend in parallel to the axial direction of the shift spindle 60.

The stopper pin 73 is formed in a cylindrical shape smaller than the restriction hole 71b and force fitted in and fixed to the mission holder 26. When the master arm 71 is pivoted in an interlocking relationship with rotation of the shift spindle 60, the inner circumference of the restriction hole 71b is abutted with the stopper pin 73 to restrict the amount of pivotal motion of the master arm 71.

As depicted in FIGS. 6 and 7, the return spring 72 is provided between the extension collar member 66 and the increased diameter portion 60b of the shift spindle 60 in the axial direction of the shift spindle 60. The return spring 72 biases the master arm 71 in a direction in which the master arm 71 returns to the position before operation thereof. The return spring 72 has a coiled portion 72a, and two end portions 72b extending from the coiled portion 72a.

The shift spindle 60 is formed with a diameter smaller than the inner diameter of the coiled portion 72a and is disposed on the coiled portion 72a such that it extends through the coiled portion 72a.

Further, as depicted in FIG. 8, the two end portions 72b extend to the restriction hole 71b along the front face of the master arm 71. The end portions 72*b* of the return spring 72 extend to an outer edge of the master arm 71 in such a manner so as to sandwich the stopper pin 73 therebetween together with the locking portion 71*e* of the master arm 71.

As depicted in FIGS. 7 and 8, a spring guide collar 68 is provided between the extension collar member 66 and the increased diameter portion 60*b* of the shift spindle 60 in the axial direction of the shift spindle 60. The spring guide collar 68 is directed in the forward and rearward direction and has the return spring 72 hereinafter described fitted thereon. The spring guide collar 68 is formed in a cylindrical shape and has an inner diameter substantially equal to the outer diameter of the shift spindle 60. The spring guide collar 68 is interposed between the shift spindle 60 and the coiled portion 72*a* of the return spring 72 for relative rotation to the shift spindle 60.

Since the spring guide collar 68 is interposed between the shift spindle 60 and the coiled portion 72*a* of the return spring 72, displacement of the shift spindle 60 in a diametrical direction is restricted. Therefore, the shift spindle 60 can be formed with a reduced inner diameter. Further, there is no necessity to reduce the inner diameter of the coiled portion 72*a* in conformity with the outer diameter of the shift spindle 60, and the diameter of the end portion 72*b* is reduced and the biasing force of the return spring 72 does not vary.

Figure 9:
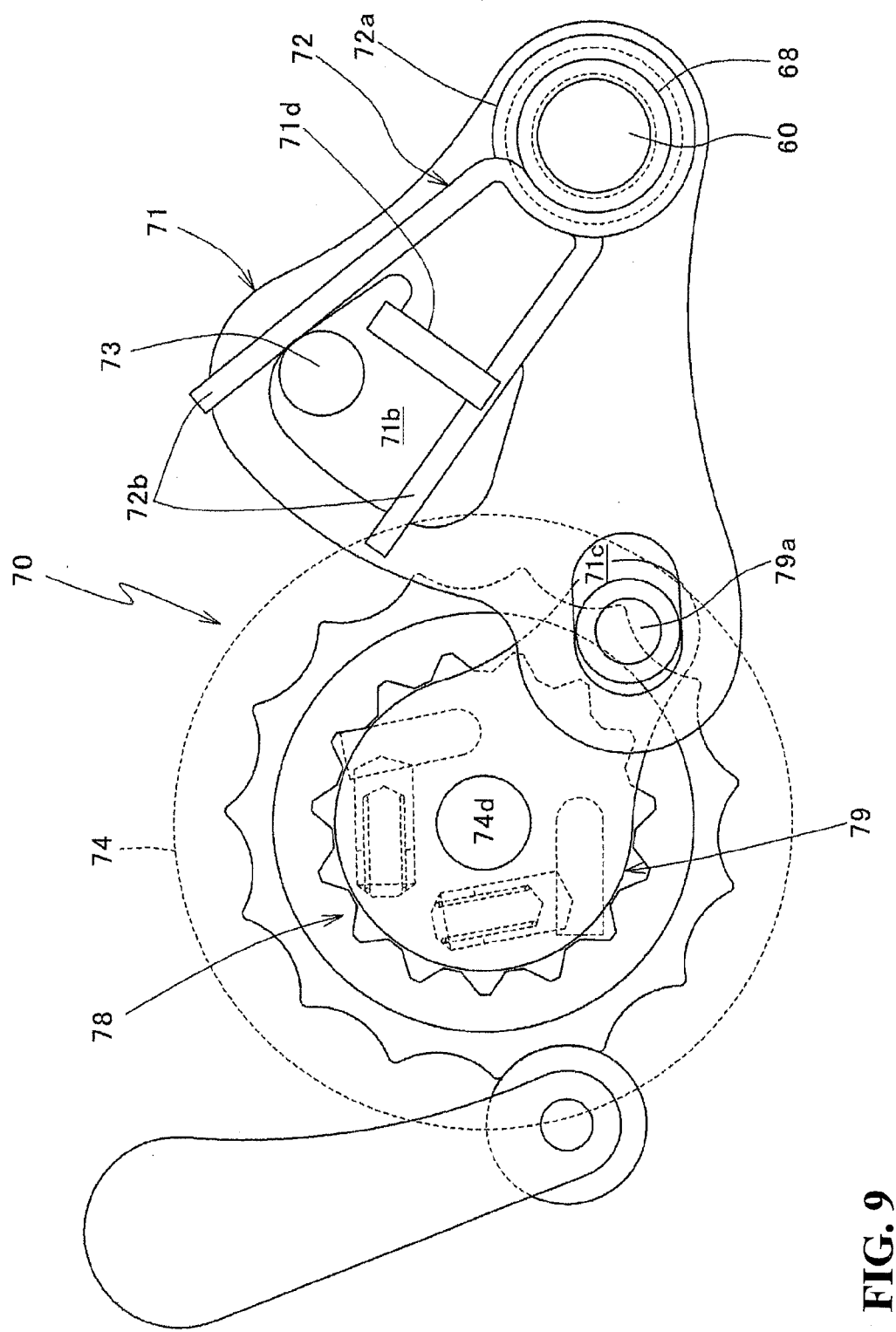
FIG. 9 is a front elevational view in a state in which a master arm is pivoted in one direction from the state of FIG. 8.

FIG. 9 is a front elevational view in a state in which the master arm 71 is pivoted in one direction from the state of FIG. 8.

When the shift spindle 60, locking portion 71*e* and stopper pin 73 are on the same line in a diametrical direction of the shift spindle 60 as depicted in FIG. 8, the master arm 71 is in a neutral position. Then, if the shift spindle 60 is rotated by an input of driving force from the inputting mechanism 50 and the master arm 71 is pivoted in one direction, then one of the end portions 72*b* of the return spring 72 is held by the stopper pin 73 while the other end portion 72*b* is pushed open against the spring force of the return spring 72 by the locking portion 71*e* of the master arm 71 as depicted in FIG. 9. Therefore, a biasing force tending to return the master arm 71 to the neutral position before the operation is applied from the return spring 72 to the master arm 71.

If the input of driving force from the inputting mechanism 50 stops and the force having acted upon the master arm 71 through the shift spindle 60 disappears, then the master arm 71 is returned to the neutral position before the operation together with the shift spindle 60 by the return spring 72.

As described hereinabove, the amount of pivotal motion of the master arm 71 is restricted by abutment of the restriction hole 71*b* of the master arm 71 with the stopper pin 73, and if the shifting speed is raised, then the master arm 71 collides forcefully with the stopper pin 73, whereupon an impact is generated. The impact generated on the master arm 71 is transmitted through the extension collar member 66 successively to the connection portion 60*e* of the shift spindle 60, input side end portion 60*c* of the shift spindle 60 and driven gear 52*f* of the speed reduction gear mechanism 52. Therefore, even if the master arm 71 is disposed at a position near to the inputting mechanism 50 in the axial direction of the shift spindle 60, the transmission route of the impact can be increased by a length equal to the length of the extension collar member 66 on the same axis without elongating the axial length of the shift spindle 60 itself. Therefore, the impact can be attenuated. Further, the impact to be transmitted from the master arm 71 to the inputting mechanism 50 can be suppressed by torsional deformation of the extension collar member 66 and the shift spindle 60.

As depicted in FIG. 6, the shift drum 74 for shifting the transmission 30 is disposed on the rear face of the mission holder 26 in the inside of the transmission chamber 29 such that a shift drum shaft 74*d* thereof projects forwardly from a front end portion 74*a* of the shift drum 74.

As depicted in FIGS. 6 and 8, the pawl ratchet mechanism 78 for intermittently rotating the shift drum 74 is provided at a central portion of the shift drum shaft 74*d* in the axial direction.

The pawl ratchet mechanism 78 includes a shift inputting member 79, a rotational member 80, and a pair of pawls 81. The shift inputting member 79 has formed thereon a driven projection 79*a* which is fitted for sliding movement in the driving hole 71*c* of the master arm 71. The rotational member 80 rotates integrally with the shift drum 74. The pawls 81 are built in the rotational member 80 and biased so as to engage with an inner periphery of the rotational member 80. If the shift inputting member 79 is pivoted in one direction under the guidance of the driven projection 79*a* which slidably moves in the driving hole 71*c* by pivotal motion of the master arm 71, then an end of one of the pawls 81 of the pawl ratchet mechanism 78 is erected uprightly and locked by the rotational member 80. Then, the rotational member 80 is pivoted in an interlocking relationship with the pivotal motion of the shift inputting member 79 to intermittently rotate the shift drum 74 to establish a shift stage of the transmission 30.

As depicted in FIG. 6, an engaging groove 74*c* is formed on an outer circumferential face 74*b* of the shift drum 74, and the shift drum 74 is supported at the front end portion 74*a* thereof for rotation on the mission holder 26 through a ball bearing 75. If the shift drum 74 is inserted as a cassette unit into the transmission chamber 29, then the shift drum 74 is supported at a rear end portion thereof (not depicted) for rotation on the rear cover 18 through a needle bearing (not depicted).

The shift fork shafts 76 are disposed on the left and right of the shift drum 74 such that they are directed in the forward and rearward direction so as to extend in parallel to the shift drum 74. The shift fork shafts 76 are supported at one end portion thereof on the mission holder 26. If the shift fork shafts 76 are inserted as a cassette unit into the transmission chamber 29, then they are supported at the other end portion thereof on the rear cover 18.

Four shift forks 77 (two are not depicted) for moving the shifter gears of the transmission 30 are supported for sliding movement in the axial direction on the shift fork shafts 76. Each of the shift forks 77 engages at a base portion 77*a* thereof with the engaging groove 74*c* of the shift drum 74 and engages at a tip end portion 77*b* thereof with the fork engaging groove 40*a* of a shifter gear of the transmission 30 (refer to FIG. 4). When the shift drum 74 rotates, the shift fork 77 is slidably moved in the axial direction of the shift fork shaft 76 under the guidance of the engaging groove 74*c* to slidably move the shifter gear of the transmission 30 to selectively establish a shift stage.

As depicted in FIG. 6, a tip end portion 74*e* of the shift drum shaft 74*d* extends through an opening 27*d* formed in the change system holder 27 and is connected to a shift position sensor 82 for detecting the shift position of the shift drum 74.

The shift position sensor 82 is positioned in front of the shift drum 74 and disposed on the front face of the change system holder 27. The shift position sensor 82 is fitted in a sensor attachment recessed portion 27*c* formed on the periphery of the opening 27*d* of the change system holder 27 and fixed to the front face of the change system holder 27 by a sensor attachment bolt 82*a*. The shift position sensor 82 detects the shift position of the shift drum 74.

An NR detection apparatus 83 for detecting the neutral position and the reverse position of the shift drum 74 and sending a signal to an ECU is provided on the periphery of the shift position sensor 82 in front of the shift drum 74.

The NR detection apparatus 83 includes a position plate 84, a neutral switch 85, and a reverse position switch 86. The position plate 84 rotates integrally with the shift drum shaft 74*d*. The neutral switch 85 detects that the shift drum 74 and comes to the neutral position by rotation of the position plate 84. The reverse position switch 86 detects that the shift drum 74 and comes to the reverse position by rotation of the position plate 84.

The position plate 84 is supported against relative rotation to the shift drum shaft 74*d* on the shift drum shaft 74*d* between the shift inputting member 79 and the change system holder 27 in the axial direction of the shift drum shaft 74*d*. The position plate 84 is formed in a shape of a disk, and a flange portion 84*a* is integrally formed on an outer circumferential edge of the position plate 84 such that it projects forwardly. A pin 84*b* is force fitted in the inside of the position plate 84 in a diametrical direction with respect to the flange portion 84*a*.

As depicted in FIG. 6, slidably movable moving elements 85*a* and 86*a* are provided on the neutral switch 85 and the reverse position switch 86, respectively. When the moving elements 85*a* and 86*a* are pushed in by the pin 84*b* or the flange portion 84*a* of the position plate 84, the neutral position and the reverse position of the transmission 30 are detected.

As depicted in FIGS. 5 and 6, the neutral switch 85 is disposed at an oblique left lower position of the front face of the change system holder 27 with respect to the shift drum shaft 74*d* on an orbit of the pin 84*b* of the position plate 84. The reverse position switch 86 is disposed at a position of the front face of the change system holder 27 on the left side of the shift drum shaft 74*d* on an orbit of the flange portion 84*a* of the position plate 84.

The embodiment of the present invention described above exhibits the following effects.

The master arm 71 is disposed so as to be positioned between the input side end portion 60*c* and the output side end portion 60*d* of the shift spindle 60 in the axial direction of the shift spindle 60. Further, the master arm 71 and the output side end portion 60*d* of the shift spindle 60 are connected to each other by the extension collar member 66 disposed with a gap left from the outer circumferential face 60*a* of the shift spindle 60. In this case, the substantial axial length of the shift spindle 60 between the inputting mechanism 50 and the master arm 71 can be increased by a length equal to the length of the extension collar member 66 within the axial length of the shift spindle 60. The twist between the inputting mechanism 50 and the master arm 71 can be increased by a length equal to the length of the extension collar member 66. Thus, even in a case in which the inputting mechanism 50 and the operation mechanism 70 are disposed on the same side on the outer side of the transmission case 17, an impact from the master arm 71 transmitted to the inputting mechanism 50 can be absorbed by torsional deformation of the extension collar member 66 and the shift spindle 60 and can be suppressed. Thus, a shift operation of high accuracy can be carried out at a high speed.

The impact from the master arm 71 is transmitted through the extension collar member 66 successively to the connection portion 60*e* of the shift spindle 60, the input side end portion 60*c* of the shift spindle 60 and the driven gear 52*f* of the speed reduction gear mechanism 52. Thus, the transmission route of the impact can be elongated on the same axis without increasing the axial length of the shift spindle 60. Consequently, also in a layout in which the length of the shift spindle 60 is short, it is possible to attenuate the impact from the master arm 71 to be transmitted to the inputting mechanism 50. Thus, a shift operation of high accuracy can be carried out at a high speed.

Since the spring guide collar 68 is interposed between the shift spindle 60 and the coiled portion 72*a* of the return spring 72, the diameter of the shift spindle 60 can be reduced without changing the size of the return spring 72 and displacement of the shift spindle 60 in a diametrical direction can be prevented. Consequently, a shift operation of higher accuracy can be carried out.

The biasing force of the return spring 72 can be kept fixed without the necessity to decrease the size of the return spring 72 in conformity with a reduction of the diameter of the shift spindle 60. Further, as the diameter of the shift spindle 60 decreases, the torsional rigidity of the shift spindle 60 drops, and therefore, the shift spindle 60 can be made likely to be twisted. Thus, it is possible to absorb an impact to be transmitted to the inputting mechanism 50, and consequently, a shift operation of high accuracy can be carried out at a high speed.

Since the washer 67 is interposed between the rear end face 66*c* of the extension collar member 66 and the transmission side supporting portion 26*a*, abrasion or displacement in rotational movement of the rear end face 66*c* of the extension collar member 66 and the transmission side supporting portion 26*a* can be prevented from being caused by rubbing between them. Especially, when the shift spindle 60 rotates, a thrust force in an axial direction from the return spring 72 acts between the rear end face 66*c* of the extension collar member 66 and the transmission side supporting portion 26*a*, and also friction increases. However, since the washer 67 is interposed at the location, the rotation of the extension collar member 66 or the shift spindle 60 can be smoothened, and consequently, a shift operation of higher accuracy can be carried out.

Spring steel is used for the shift spindle 60 to improve the modulus of elasticity of the shift spindle 60 itself. Therefore, the shift spindle 60 is likely to be twisted, and an impact to be transmitted to the inputting mechanism 50 is absorbed. Consequently, a shift operation of high accuracy can be carried out at a high speed.

Since the shift spindle 60 is formed in a hollow cylindrical shape, the torsional rigidity of the shift spindle 60 drops, and the shift spindle 60 can be made likely to be twisted. Consequently, an impact to be transmitted to the inputting mechanism 50 can be absorbed, and a shift operation of high accuracy can be carried out at a high speed.

The sensor shaft 65 is inserted in the inside of the shift spindle 60 in a spaced relationship from the inner circumferential face 60*f* of the shift spindle 60 with a gap left therebetween. Further, the rear end portion 65*b* which is one end portion of the sensor shaft 65 is connected to the inner circumferential face 60*f* of the output side end portion 60*d* of the shift spindle 60. Further, the rotational angle sensor 64 is connected to the front end portion 65*a*, which is the other end portion of the sensor shaft 65, so as to detect the angle of rotation of the sensor shaft 65. Therefore, the angle of rotation of the output side end portion 60*d* of the shift spindle 60 fixed integrally to the sensor shaft 65 can be detected by the rotational angle sensor 64. Consequently, the detection accuracy of the rotational angle sensor 64 can be made precise. Thus, a shift operation of high accuracy can be carried out.

Since the rotational angle sensor 64 is attached to the front face of the reduction gear holder 28 on the outer side of the transmission case 17, it is not influenced by heat from the combustion chambers or the transmission chamber 29 generated where the rotational angle sensor 64 is attached in the transmission chamber 29 behind the output side end portion 60*d* of the shift spindle 60. Consequently, the detection accuracy of the rotational angle sensor 64 can be kept high, and a shift operation of high accuracy can be carried out. Further, since the rotational angle sensor 64 is attached to the front face of the reduction gear holder 28, wiring of a harness for the sensor and exchange of the rotational angle sensor 64 can be facilitated.

Where the inputting mechanism 50, shift spindle 60 and operation mechanism 70 are disposed on the same side in front of the mission holder 26 which configures the transmission case 17 as in the present embodiment, in other words, even if the components mentioned are disposed on the outer side of the transmission case 17, the rotational angle sensor 64 can be attached to the front face of the reduction gear holder 28 on the outer side of the transmission case 17. Therefore, the rotational angle sensor 64 is not influenced by heat generated where it is attached in the transmission chamber 29 behind the output side end portion 60*d* of the shift spindle 60. Consequently, the detection accuracy of the rotational angle sensor 64 can be kept high, and a shift operation of high accuracy can be carried out.

While the present embodiment has been described with reference to the drawings, the embodiment is not limited to the substance of the foregoing description and can be modified without departing from the subject matter of the present invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A variable speed drive for an internal combustion engine, comprising:
    a transmission having a plurality of gear trains;
    a transmission case for accommodating the transmission;
    an operation mechanism selectively establishing a shift stage of the transmission;
    a shift spindle operatively connected to the operation mechanism; and
    an inputting mechanism operatively connected to the shift spindle for rotating the shift spindle;
    the operation mechanism including a master arm pivoted integrally with the shift spindle and a stopper member restricting the amount of the pivotal movement of the master arm;
    the shift spindle having an input side end portion to which the inputting mechanism is connected and an output side end portion supported for rotation on a transmission side supporting portion provided on the transmission case;
    the master arm being positioned between the input side end portion and the output side end portion in an axial direction of the shift spindle;
    the master arm having an extension collar member fixed integrally thereto;
    the extension collar member connecting the master arm and a connection portion provided at a location of the shift spindle rather near to the input side end portion than the output side end portion;
    the extension collar member extending from the connection portion toward the master arm with a gap formed between an outer circumferential face of the shift spindle and an inner circumferential face of the extension collar member.

2. The variable speed drive for an internal combustion engine according to claim 1,
    wherein a return spring biasing the master arm in a direction to return the master arm to a position before an operation thereof is provided in the operation mechanism;
    the return spring includes a coiled portion and two end portions extending from the coiled portion;
    the shift spindle is formed with a diameter smaller than the inner diameter of the coiled portion of the return spring;
    the shift spindle is disposed so as to extend through the coiled portion of the return spring; and
    a spring guide collar is interposed between the shift spindle and the coiled portion of the return spring.

3. The variable speed drive for an internal combustion engine according to claim 2, wherein a washer is interposed between the extension collar member and the transmission side supporting portion.

4. The variable speed drive for an internal combustion engine according to claim 1, wherein spring steel is used for the shift spindle.

5. A variable speed drive for an internal combustion engine, comprising:
    a transmission having a plurality of gear trains;
    a transmission case for accommodating the transmission;
    an operation mechanism for selectively establishing a shift stage of the transmission;
    a shift spindle operatively connected to the operation mechanism and extending outwardly from the transmission case;
    an inputting mechanism operatively connected to the shift spindle for rotating the shift spindle; and
    a rotational angle sensor detecting the angle of rotation of the shift spindle;
    the shift spindle being formed in a hollow cylindrical shape and having an input side end portion to which the inputting mechanism is connected and an output side end portion supported for rotation on a transmission side supporting portion of the transmission case;
    a sensor shaft being inserted in the inside of the shift spindle in a spaced relationship from an internal circumferential face of the shift spindle with a gap left therebetween;
    the sensor shaft being connected at one end portion thereof to an inner circumferential face of the output side end portion of the shift spindle;
    the rotational angle sensor being provided at the other end portion of the sensor shaft so as to detect the angle of rotation of the sensor shaft.

6. The variable speed drive for an internal combustion engine according to claim 5, wherein the operation mechanism includes a master arm pivoted integrally with the shift spindle and a stopper member restricting the amount of the pivotal movement of the master arm;
    the shift spindle having an input side end portion to which the inputting mechanism is connected and an output side end portion supported for rotation on a transmission side supporting portion provided on the transmission case;

the master arm being positioned between the input side end portion and the output side end portion in an axial direction of the shift spindle;

the master arm having an extension collar member fixed integrally thereto;

the extension collar member connecting the master arm and a connection portion provided at a location of the shift spindle rather near to the input side end portion than the output side end portion;

the extension collar member extending from the connection portion toward the master arm with a gap formed between an outer circumferential face of the shift spindle and an inner circumferential face of the extension collar member.

7. The variable speed drive for an internal combustion engine according to claim 6, wherein the operation mechanism includes a return spring biasing the master arm in a direction to return the master arm to a position before an operation thereof;

the return spring includes a coiled portion and two end portions extending from the coiled portion;

the shift spindle is formed with a diameter smaller than the inner diameter of the coiled portion of the return spring;

the shift spindle is disposed so as to extend through the coiled portion of the return spring; and a spring guide collar is interposed between the shift spindle and the coiled portion of the return spring.

8. The variable speed drive for an internal combustion engine according to claim 7, wherein a washer is interposed between the extension collar member and the transmission side supporting portion.

9. The variable speed drive for an internal combustion engine according to claim 6, wherein spring steel is used for the shift spindle.

10. A variable speed drive for an internal combustion engine, comprising:
    a transmission having a plurality of gear trains;
    an operation mechanism selectively establishing a shift stage of the transmission;
    a shift spindle operatively connected to the operation mechanism; and
    an inputting mechanism operatively connected to the shift spindle for rotating the shift spindle;
    the operation mechanism including a master arm pivoted integrally with the shift spindle and a stopper member restricting the amount of the pivotal movement of the master arm;
    the shift spindle having an input side end portion to which the inputting mechanism is connected and an output side end portion supported for rotation on a transmission side supporting portion;
    the master arm being positioned between the input side end portion and the output side end portion in an axial direction of the shift spindle;
    the master arm having an extension collar member fixed integrally thereto;
    the extension collar member connecting the master arm and a connection portion provided at a location of the shift spindle rather near to the input side end portion than the output side end portion;
    the extension collar member extending from the connection portion toward the master arm with a gap formed between an outer circumferential face of the shift spindle and an inner circumferential face of the extension collar member.

11. The variable speed drive for an internal combustion engine according to claim 10,
    wherein a return spring biasing the master arm in a direction to return the master arm to a position before an operation thereof is provided in the operation mechanism;
    the return spring includes a coiled portion and two end portions extending from the coiled portion;
    the shift spindle is formed with a diameter smaller than the inner diameter of the coiled portion of the return spring;
    the shift spindle is disposed so as to extend through the coiled portion of the return spring; and
    a spring guide collar is interposed between the shift spindle and the coiled portion of the return spring.

12. The variable speed drive for an internal combustion engine according to claim 11, wherein a washer is interposed between the extension collar member and the transmission side supporting portion.

13. The variable speed drive for an internal combustion engine according to claim 10, wherein spring steel is used for the shift spindle.

* * * * *